United States Patent [19]

Malvern

[11] Patent Number: 5,018,858
[45] Date of Patent: May 28, 1991

[54] RING RESONATOR GYROSCOPE CONTROL SYSTEM WITH GAIN DIFFERENCE EQUALIZATION

[75] Inventor: Allan R. Malvern, Bracknell, England

[73] Assignee: British Aerospace Public Limited Company, London, England

[21] Appl. No.: 412,805

[22] Filed: Sep. 27, 1989

[30] Foreign Application Priority Data

Oct. 4, 1988 [GB] United Kingdom ............... 8823250

[51] Int. Cl.$^5$ .............................................. G01B 9/02
[52] U.S. Cl. ................................................ 356/350
[58] Field of Search ....................................... 356/350

[56] References Cited

U.S. PATENT DOCUMENTS

| | | |
|---|---|---|
| 4,632,555 | 12/1986 | Malvern . |
| 4,673,293 | 6/1987 | Sanders ............................. 356/350 |
| 4,687,330 | 8/1987 | Lefevre ............................. 356/350 |
| 4,815,321 | 3/1989 | Malvern . |
| 4,820,008 | 4/1989 | Malvern . |

OTHER PUBLICATIONS

Passive Fiber-Optic Ring Resonator for Rotation Sensing, Meyer et al, Optics Letters, vol. 8, 12-1983, pp. 644-646.

Passive Ring Resonator Method for Sensitive Inertial Rotation Measurements in Geophysics and Relativity, Sanders et al, Optics Letters, 11-1981, pp. 569-571.

Primary Examiner—Samuel Turner
Attorney, Agent, or Firm—Cushman, Darby & Cushman

[57] ABSTRACT

A system for controlling the frequency of one of the CW and CCW beams in a ring resonator gyroscope in which the relative intensities of the second harmonic of the path length control signal in the CW and CCW beam are used to generate a control signal to null the gain differences between the photodetectors and preamplifiers in the CW and CCW channels. The scheme allows a greater degree of common mode rejection than known systems.

16 Claims, 5 Drawing Sheets

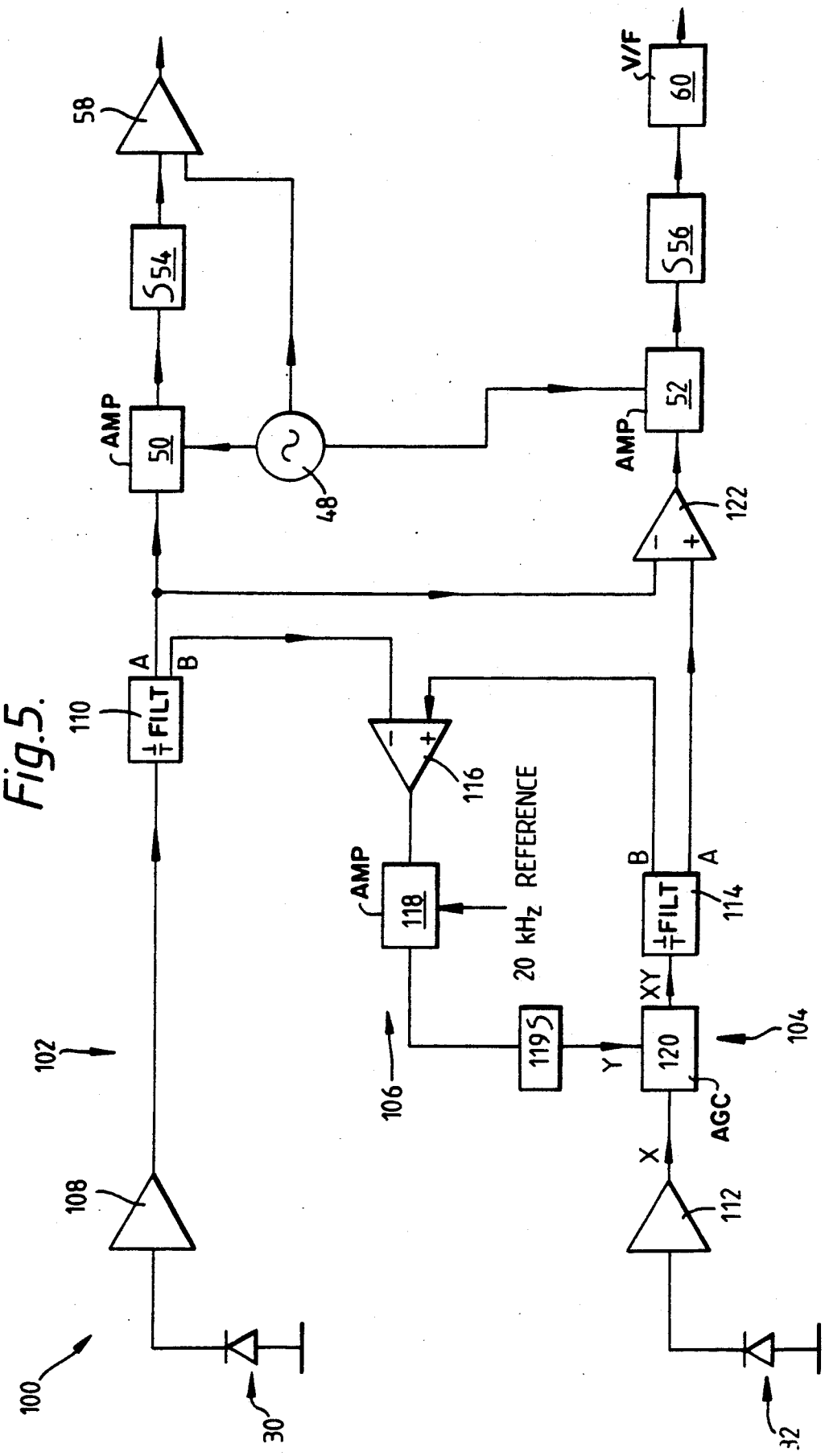

RING RESONATOR GYROSCOPE CONTROL SYSTEM WITH GAIN DIFFERENCE EQUALIZATION

BACKGROUND OF THE INVENTION

The present invention relates to a ring resonator gyroscope.

A known ring resonator gyroscope will now be described with reference to FIGS. 1 and 4 of the accompanying drawings in which:

Referring to FIG. 1, a ring resonator gyroscope is indicated generally at 10 and operates by inserting laser light into a resonator so as to form clockwise (CW) and counterclockwise (CCW) beams. The ring resonator gyroscope 10 comprises a fibre resonator 12 formed by connecting a length of optical fibre 14 back onto itself in a coupler 16 which has a high coupling ratio.

A laser 18 produces a laser beam of narrow linewidth which is split at a beamsplitter 20 to allow insertion of light in both directions in the fibre resonator 12 and also to allow separate monitoring of the light in each direction.

Acousto-optic deflectors 22 and 24 are placed in each path to allow the relative frequency of the CCW and CW beams respectively to be adjusted. The CW beam is deflected by a mirror 25 to the deflector 24. Microscope objectives 26 and 27 focus laser light onto the ends of the fibre 14.

Portions of the CW and CCW beams exit the fibre resonator 12 via the coupler 16. Beamsplitters 28 and 29 reflect the exiting CW and CCW beams into photodetectors 30 and 32 respectively.

The output intensity is derived from the coherent addition of all of the combined delayed waves of varying amplitude and phase and depends on the coupling ratio of the coupler 16, the wavelength of the laser source and the delay time of the fibre resonator 12.

FIG. 3 shows the resonance characteristics of a fibre resonator. Changing the phase path of the fibre resonator by changing the length of the fibre resonator or the source wavelength will vary the resonance characteristic because of the consequent change in the relative phases of the combining waves. When the phase path is an integral number of wavelengths the resonance characteristic exhibits a null. The intensity inside the loop has an inverse function to that of the output. At resonance, zero output intensity, the wave continually recirculates within the loop, and is lost by scattering from the loop.

Resonant peaks occur at frequencies spaced by the 'free spectral range' (FSR) of the fibre resonator where:

$FSR = c/nL$ where c is the velocity of light
n is the fibre refractive index
L is the length of the fibre resonator.

The quality of the cavity is defined by the 'finesse' (F) which is the ratio of the FSR to the resonance line width ($\Delta f$):

$$F = \frac{FSR}{\Delta f}$$

If a typical fibre resonator is considered, with a loop length of 10 meters, the spacing between modes is about 20 MHz, and if the finesse of the resonator is 100 the halfwidth of the resonance is 200 KHz.

In FIG. 1, the light impinging on the photodetector 30 is used to control the path length of the fibre resonator 12 to maintain resonance. This is achieved by causing an electrical control signal to be supplied to a cylindrical piezoelectric transducer (PZT) 34 around which the fibre 14 is wound and which is operable to stretch the fibre 14.

Referring to FIG. 2, a frequency and path length control system is indicated generally at 40 and comprises:

two low noise amplifiers 42 and 44 to which the photodetectors 30 and 32 respectively are connected;
a differential amplifier 46 receiving the output of the amplifiers 42 and 44;
an oscillator 48 operating at frequency Wc connected to two lock-in amplifiers 50 and 52 the inputs of which are connected to the outputs of the low noise amplifier 42 and the differential amplifier 46 respectively;
two integrators 54 and 56 having inputs connected to the lock-in amplifiers 50 and 52 respectively;
a high-voltage amplifier 58 having inputs connected to the oscillator 48 and integrator 54 and an output connected to the PZT 34;
a voltage-to-frequency convertor 60 having an input connected to the integrator 56 and an output connected to the acousto-optic deflector 22.

In FIG. 2, the difference in intensity of the CW and CCW beams sensed by the photodetectors 30 and 32 at frequency Wc is used as the error signal to drive the frequency of the acoustic optic deflector 24 to the minimum of the CW resonance.

The path length is altered by applying a sinusoidal modulation on the PZT 34 at a frequency Wc (typically 10 kHz) via the high voltage amplifier 58. If the path length is not held accurately, there will be a signal on the photodetector 30 at frequency Wc, the sign of which determines which side of the resonance is the fibre length. FIG. 4 shows the variation of the light intensity at frequencies Wc and 2Wc as a function of detuning from line centre. The former goes through zero at line centre, and so can be used as an error signal to drive the path length to line centre. The arrangement shown in FIG. 2 achieves this by a synchronous detection scheme using the lock-in amplifier 50 with the reference signal at frequency Wc. If there is offset in the path length on the pathlength servo (so that the servo is not on the exact minimum of the CW resonance) then this should also appear on the CCW beam, as the path length affects both directions equally so that the signal driving the frequency servo (ie. driving acousto-optic deflector 24) is only responsive to the non-reciprocal signals.

Acousto-optic deflector 22 is held at a fixed frequency for the CCW beam. The light in the CW beam goes through acousto-optic deflector 24 which gives a variable frequency offset according to the output from the voltage-to-frequency convertor 60.

A disadvantage of the arrangement shown in FIG. 2 is that it only gives a small amount of common-mode rejection which depends upon the relative gains of the two low noise amplifiers 42 and 44. Also there may be slight differences in the intensities of light falling onto the two photodetectors 30 and 32 which will again reduce the effectiveness of this scheme to reduce common mode signal errors.

It is an object of the present invention to provide an improved frequency control system for a ring resonator gyroscope.

SUMMARY OF THE INVENTION

According to the present invention we provide a system for controlling the frequency of a light beam in a ring resonator gyroscope in which, in use, there are two beams, one travelling CW and the other travelling CCW, comprising:

a first channel comprising first detector means for receiving a portion of the CW beam and first amplifier means for amplifying a signal from the first detector means to form a CW signal;

a second channel comprising second detector means for receiving a portion of the CCW beam and second amplifier means for amplifying a signal from the second detector means to form a CCW signal;

and means for comparing the CW and CCW signals, characterised by gain control means for nulling the gain differences between the first and second channels.

A system according to the present invention allows considerably more common mode rejection of any path length offset due to errors in the path length servo and therefore improves the performance of the ring resonator gyroscope.

In the embodiment to be described the gain control means is operable to control the gain of one of the first and second amplifier means.

The system may comprise means for modulating the path length of the ring resonator gyroscope at a frequency Wc and means for comparing the relative intensities of signals at a frequency 2Wc in the CW and CCW beams and means for using the intensity difference to generate a gain control signal.

On both of the CW and CCW signals there is a strong second harmonic signal, the amplitude of which is first order independent of tuning near line centre. Certainly it is a lot less sensitive to path length position near the line centre than the first harmonic signal as can be seen in FIG. 4. The relative intensity of the second harmonic signal therefore provides a control signal to take out the gain differences between the first and second channels.

The gain control means may comprise a dual channel filter in each of the first and second channels wherein each of the dual channel filters is operable to select signals at a frequency of 2Wc on one channel for use in gain control and to suppress signals at a frequency of 2Wc on the other channel to provide a signal for use in path length control.

In the embodiment to be described the gain control means comprises a differential amplifier for comparing the outputs of said one channels of the dual channel filters and which is connected to a lock-in amplifier referenced to 2Wc connected to resistive means for controlling the gain of one of the first and second channels.

BRIEF DESCRIPTION OF THE DRAWINGS

FIG. 5 is a block diagram representation of the embodiment of the invention.

An embodiment of a system according to the present invention will now be described, by way of example, with reference to FIG. 5 of the accompanying drawings which shows the components in a system for controlling the frequency of a light beam in a ring resonator gyroscope and for controlling the resonator path length.

Figure 1:
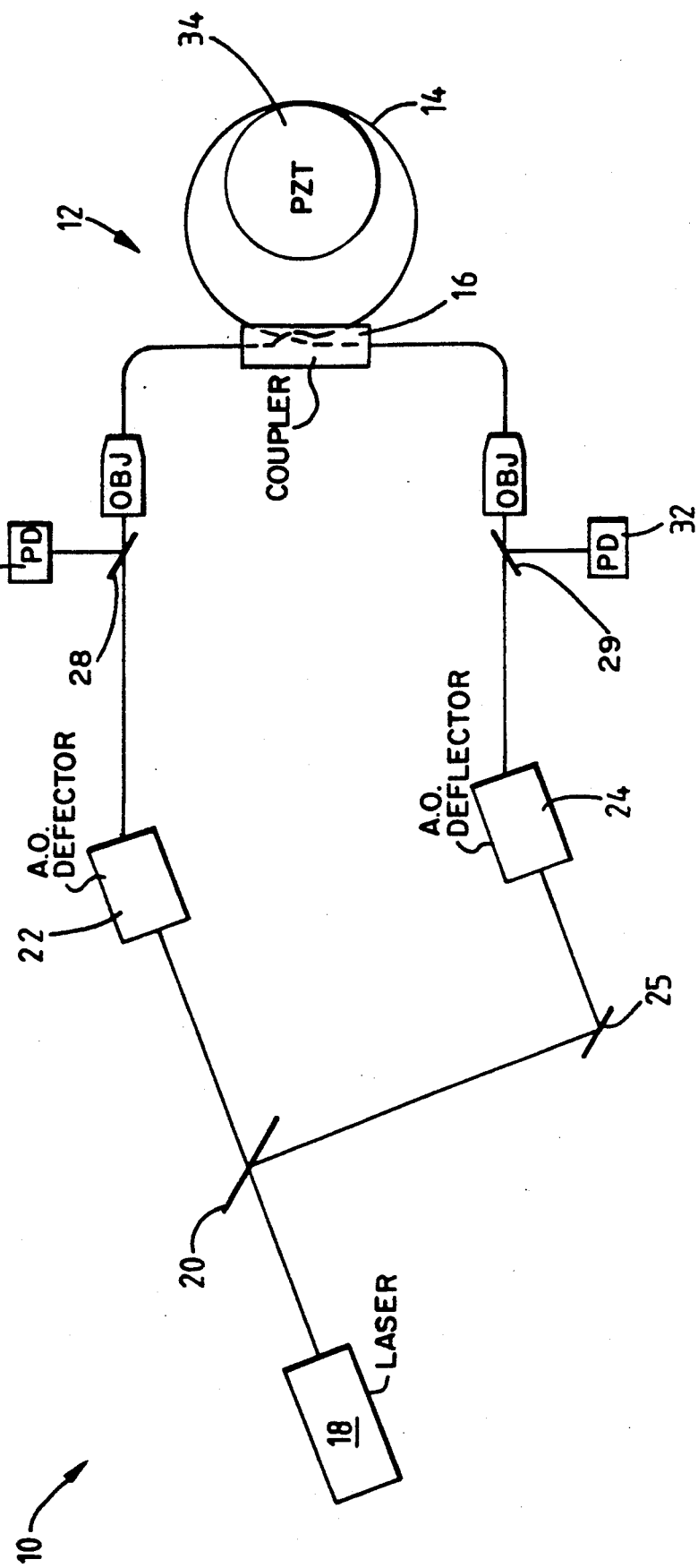
FIG. 1 is a schematic representation of a ring resonator gyroscope.
Figure 2:
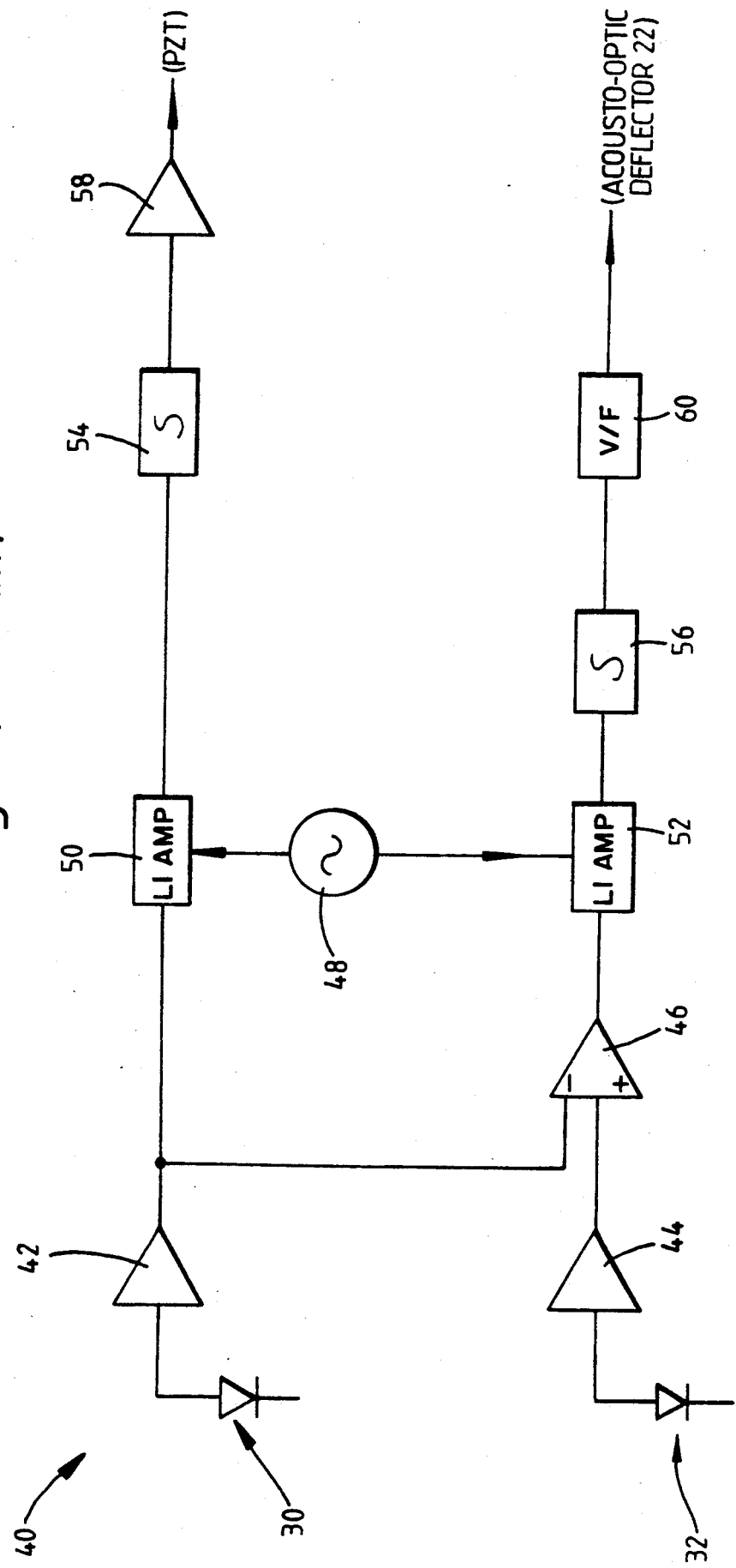
FIG. 2 shows the components in a frequency and path length control system for the ring resonator gyroscope of FIG. 1.
Figure 3:
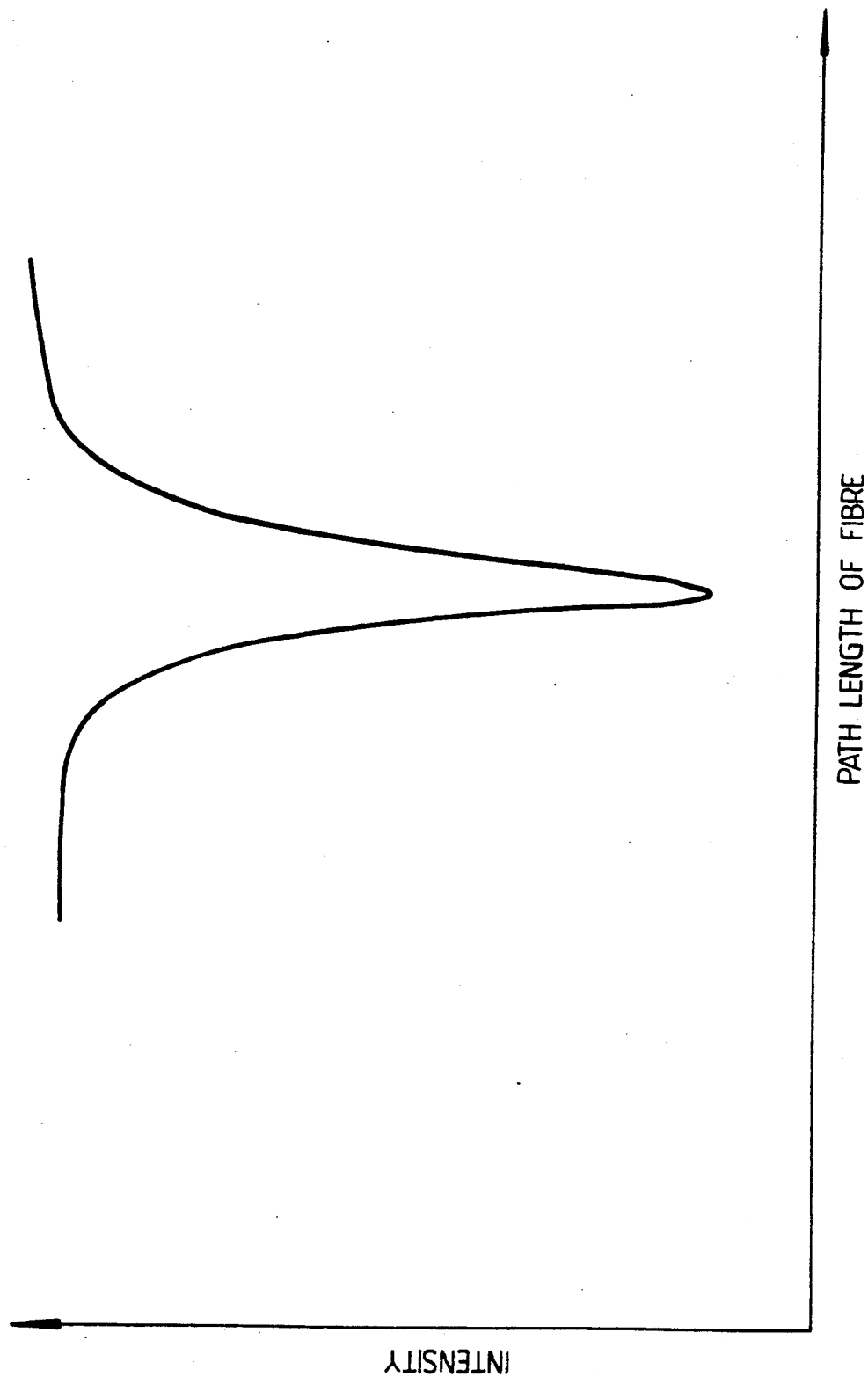
FIG. 3 illustrates the resonance characteristic of a ring resonator gyroscope.
Figure 4:
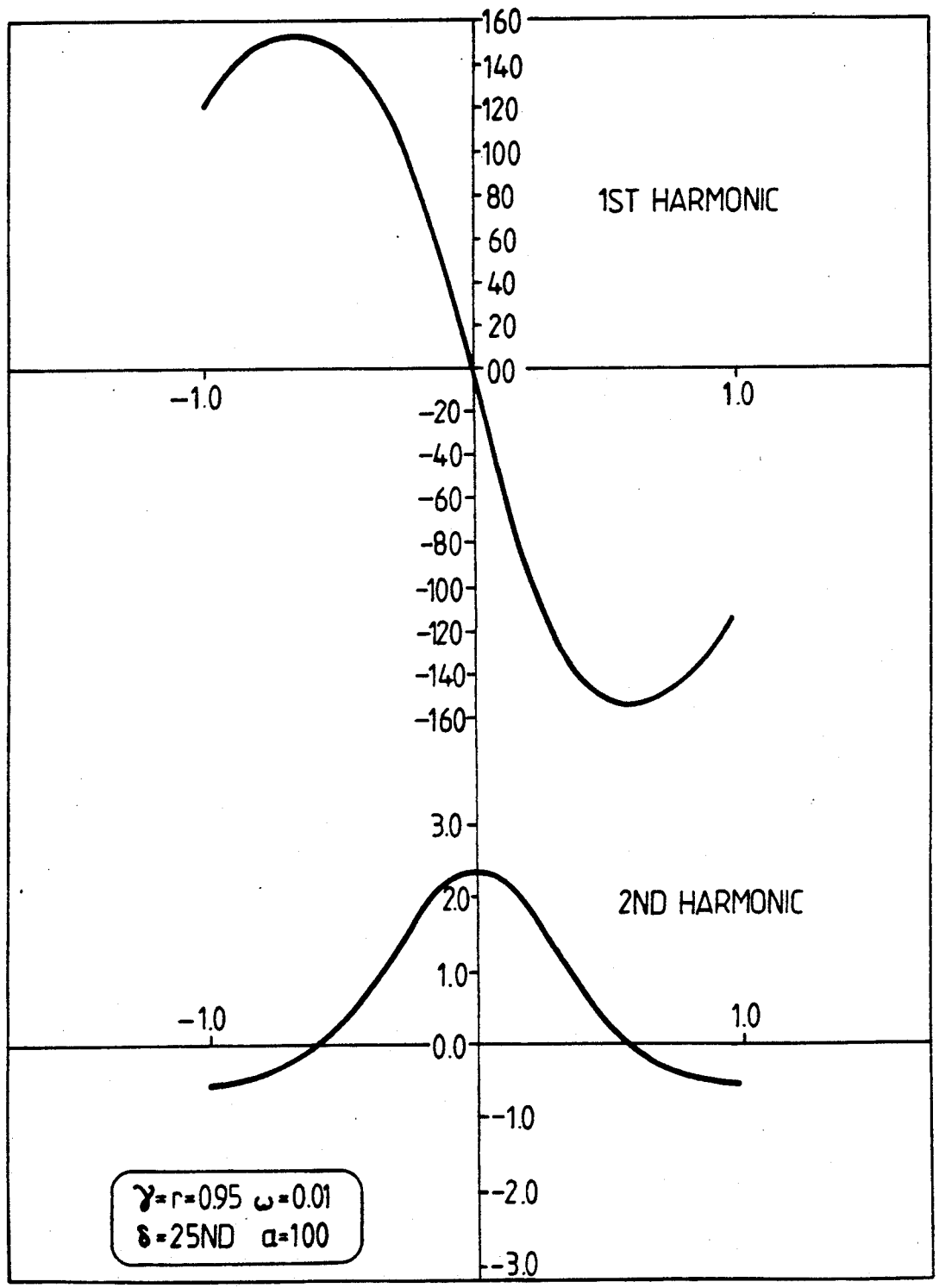
FIG. 4 shows the variation of light intensity at two frequencies, $W_c$ and $2W_c$, as a function of detuning from the line center.

In FIG. 5 the components of the system, which is indicated generally at 100, which are common with the known system previously described are given the same reference numbers as in FIGS. 1 and 2.

The system 100 comprises first and second channels 102 and 104 for detecting the CW and CCW beams respectively and for producing CW and CCW signals and further comprises gain control means 106.

The first channel 102 comprises the photodetector 30, a low noise amplifier 108 and a dual channel switched capacitor filter 110. The second channel 104 comprises the photodetector 32, a low noise amplifier 112 and a dual channel switched capacitor filter 114.

The gain control means 106 is associated with the second channel 104 and comprises a differential amplifier 116 connected to the outputs of the filters 110 and 114, a lock-in amplifier 118 referenced to 20 KHz, an integrator 119 and automatic gain control means 120 comprising a multiplier for controlling the gain of the first channel 102. The 20 kHz reference and the 10 kHz reference are derived from the same source and are consequently synchronous.

An instrumentation amplifier 122 receives the 'A' channel outputs from the filters 110 and 114 and supplies a difference signal to the lock-in amplifier 52.

In operation, light from the CW and CCW beams is detected by the photodetectors 30 and 32 and the signals obtained are amplified in the amplifiers 108 and 112 respectively. The CCW signal is subjected to a variable gain adjustment in the automatic gain control means 120 which ensures that the amplitudes of the CW and CCW signals are equalised. In this example a carrier frequency of 10 kHz is used which can be dervied from a faster clock which enables a 20 kHz signal also to be derived.

The filters 110 and 114 each have a 20 kHz notch on channels 'A' to suppress the large amount of 20 kHz signal present on these two channels compared to the small amount of 10 kHz signal when the deviation from the line centre is small. Notching out the 20 kHz signal allows more gain in later stages without the danger of saturation to amplify up the small 10 kHz signals that are present. On channels 'B' there is a 20 kHz band pass filter allowing through the 20 kHz signal, which is reasonably constant near line centre. The two 20 kHz signals are compared by the differential amplifier 116, and the difference is used as an error signal for the lock-in amplifier 118. The output from the integrator 119 is supplied to the automatic gain control means 120 which comprises a multiplier circuit for controlling the gain in the second channel 104.

The two channel 'A' signals from filters 110 and 114 are differenced in the instrumentation amplifier 122. The difference signal is then used, as before, to control the frequency of the acousto-optic deflector 24, to alter the difference frequency between the CW and CCW beams.

Hence, the system described above utilises the relative intensities of the second harmonic signals present in the CW and CCW beams to provide a control signal to null the gain differences between the photodetectors and pre-amplifiers in the first and second channels.

This technique allows considerably more common mode rejection of any path length offset due to errors in the path length servo than in known systems. Typical figures might be that the path length is maintained to $10^{-4}$ of a linewidth of the resonance, and then with a factor of 100 of common mode rejection using the gain matching techniques of the present invention, the frequency servo should be accurate to $10^{-6}$ of a line width. This improvement in performance therefore feeds directly into a proportional reduction in the gyro bias error.

In contrast, the scheme used previously might be expected to give only a factor of 10 common mode rejection when account of ageing and temperature stability of the two photodiode preamplifier assemblies is taken. Therefore, there can be an improvement by a factor of 10 in the gyro bias performance by implementing the present invention.

I claim:

1. A system for controlling characteristics of a ring resonator gyroscope in which, in use, there are two beams, one travelling in a first direction and the other travelling in a second direction different than the first direction comprising:
   a first channel comprising first detector means for receiving a portion of the first direction beam and first amplifier means for amplifying a signal from the first detector means to form a first signal;
   a second channel comprising second detector means for receiving a portion of the second direction beam and second amplifier means for amplifying a signal from the second detector means to form a second signal;
   means for obtaining samples of the first and second signals and for comparing the samples; and
   gain control means for nulling gain differences between the first and second channels based on an amount of difference between said samples.

2. A system according to claim 1 wherein the gain control means is operable to control the gain of the first amplifier means.

3. A system according to claim 1 further comprising means for modulating a path length of the ring resonator gyroscope at a frequency Wc and wherein said comparing means compares relative intensities of signals at a frequency 2Wc in the samples of the first and second direction beams and means for using the intensity difference to generate a gain control signal.

4. A system according to claim 3 further comprising a dual channel filter in each of the first and second channels, wherein each of the dual channel filters includes means for selecting signals at a frequency of 2Wc on one channel for use in gain control and coupling the 2Wc signals to said comparing means and for suppressing signals at the frequency of 2Wc on the other channel to provide signals for use in path length control.

5. A system according to claim 4 wherein the gain control means comprises a differential amplifier for comparing outputs of said one channel of the dual channel filters, a lock-in amplifier connected to said dual channel amplifier and referenced to 2Wc and a multiplier circuit connected to receive an output of said lock-in amplifier for controlling the gain of one of the first and second channels based therein.

6. A system according to claim 4 or claim 5 wherein the dual channel filters comprise switched capacitor filters.

7. A system according to claim 1 wherein said first direction beam is a clockwise beam and said second direction beam is a counter clockwise beam.

8. A system according to claim 1 wherein said first direction beam is a counter clockwise beam and said second direction beam is a clockwise beam.

9. A system according to any of claims 1-5, 7 or 8 wherein the first channel comprises path length control means and the second channel comprises frequency control means and wherein the gain control means is associated with the second channel.

10. A system according to claim 1 further comprising a dual channel filter in each of the first and second channels, wherein each of the dual channel filters includes means for selecting signals at a frequency of 2Wc on one channel for use in gain control and coupling the 2Wc signals to said comparing means and for suppressing signals at the frequency of 2Wc on the other channel to provide signals for use in path length control.

11. A system as in claim 1 further comprising filter means, in each of said first and second channels, each for producing a first output including frequency components having a predetermined frequency as said samples, and a second output including all frequency components except said predetermined frequency, said comparing means including means for comparing said first outputs of said first and second channels respectively, and producing an error signal representing an intensity difference therebetween which is used to control said gain control means to control the gain of the first amplifier means.

12. A system as in claim 11 further comprising means for modulating a path length of the ring resonator gyroscope at a frequency Wc and wherein said predetermined frequency is a frequency 2Wc.

13. A system as in claim 12 wherein said filter means includes a switched capacitor filter.

14. A system as in claim 11 wherein said gain control means is a multiplier which multiplies by a signal indicative of said error signal.

15. A system for controlling frequency of a light beam in a ring resonator gyroscope comprising:
   a first channel including means for receiving a beam travelling in said gyroscope in a first direction;
   a second channel comprising means for receiving a beam travelling in said gyroscope in a second direction;
   means for modulating a path length of said gyroscope at a first frequency;
   means for obtaining a sample of both said first direction and said second direction signals at a predetermined harmonic of said first frequency;
   means for comparing said predetermined harmonic samples; and
   gain control means, coupled to an output of said comparing means, for equalizing gains of said first and second direction signals based on an amount of difference detected by said comparing means.

16. A method for controlling a frequency of light beam in a ring resonator gyroscope comprising the steps of:

causing a first beam to travel in said gyroscope in a first direction;

causing a second beam to travel in said gyroscope in a second direction;

modulating a path length of said gyroscope at a first frequency;

obtaining a sample of both said first direction and second direction signals at a predetermined harmonic of said first frequency;

comparing said predetermined harmonic samples; and equalizing gains of said first and second direction signals based on an amount of difference determined in said comparing step.

* * * * *